United States Patent [19]
Been et al.

[11] Patent Number: 5,272,304
[45] Date of Patent: Dec. 21, 1993

[54] HIGH-FREQUENCY DIELECTRIC HEATING HAND-OPERATED SEALER FOR MEDICAL TUBING

[75] Inventors: Bernard W. Been, Den Haag; Frank T. Biekart, Emmen; Mirjam Van Iterson, Capelle a/d Ijssel; Theo Luycx, Delft, all of Netherlands

[73] Assignee: NPBI Nederlands Produktielaboratorium Voor Bloedtransfusieapparatuur en Infusievloeistoffen B.V., Emmer-Compascuum, Netherlands

[21] Appl. No.: 938,773

[22] Filed: Aug. 28, 1992

[51] Int. Cl.⁵ .................................... H05B 6/54
[52] U.S. Cl. ......................... 219/10.81; 219/10.73; 219/230; 156/380.6
[58] Field of Search ............ 219/10.81, 10.73, 230; 156/273.7, 274.4, 274.6, 380.1, 380.3, 380.4, 380.6, 380.7, 380.8

[56] References Cited

U.S. PATENT DOCUMENTS

| | | | |
|---|---|---|---|
| 2,437,770 | 3/1948 | Van Olden | 219/230 |
| 2,441,817 | 5/1948 | Huff | 219/230 |
| 3,031,561 | 4/1962 | Shaffer | 219/230 |
| 3,752,017 | 8/1973 | Lloyd et al. | 219/234 |
| 4,013,860 | 3/1977 | Hosterman et al. | 219/10.81 |
| 4,384,186 | 5/1983 | Burt | 219/10.81 |
| 4,490,598 | 12/1984 | Minney et al. | 219/10.81 |

Primary Examiner—Philip H. Leung
Attorney, Agent, or Firm—Herbert Dubno

[57] ABSTRACT

A medical tubing sealer has its electrodes extending from a handle in line therewith and one electrode shiftable by a lever transverse to the major dimension of the handle to provide a particularly ergonomic configuration. The lever acts upon the clamping electrode via a leaf spring.

13 Claims, 7 Drawing Sheets

HIGH-FREQUENCY DIELECTRIC HEATING HAND-OPERATED SEALER FOR MEDICAL TUBING

FIELD OF THE INVENTION

Our present invention relates to an apparatus for sealing medical plastic tubing in hospitals, laboratories, blood-bank and like environments using high frequency energy, for example, radio frequency energy.

BACKGROUND OF THE INVENTION

For the collection and preparation of blood in blood-banks and hospitals, for the processing of medical fluids, for the processing of nutrient fluids to be administered to a patient and, in general, for the transfer of fluids to and from a donor, patient or recipient, increasing use is being made of blood bag, infusion-set and like systems in which plastic tubing is connected to a bag.

Frequently that plastic tubing must be sealed. While sealing can be effected with a clamp or some other valve arrangement, it has become a common practice to utilize thermal energy or high frequency energy to seal the tubing which is generally composed of a flexible plastic such as polyvinylchloride.

The sealing of medical tubing in this manner provides a hermetic and sterile seal to a bag system to which the tubing is attached and the seal is not fragile or susceptible to inadvertent opening.

Manually operated sealing devices for this purpose have been marketed, for example, by Sebra of Tuscon, the sealing device containing an electric circuit for the generation of high frequency energy, a coaxial cable transmitting this energy to the manually operated device which has a pair of sealing jaws formed with electrodes between which the tubing is insertable, and means for drawing the jaws together to clamp the tubing between the jaws, apply the high frequency energy to the electrodes to render the opposite internal surfaces of the tubing fusible, and causing these opposite surfaces to bond together to form the seal of the tubing.

The high frequency energy applied to the electrodes effects a dielective heating of the tubing between them since the electrodes function more or less as capacitor plates.

A system in which electrodes form capacitor plates to effect dielective heating between sealing jaws for squeezing the tubing between them is described in U.S. Pat. No. 4,013,860.

The device described in this patent contains a high frequency generator which produces electrical energy with a fundamental frequency of 40.68 MHz connected to the hand-held sealer unit by a 50 OHM coaxial cable. The tube sealer itself contains a resonant circuit which transforms the supplied energy to a high voltage at high frequency. This voltage, which can be about 1500 volts, is sufficient to generate enough heat in the polyvinylchloride to enable it to fuse between the sealing jaws.

The sealing process is begun by introducing the tubing between the two sealing jaws and placing these jaws together. The high frequency field is applied between these jaws which function as capacitor plates and the dielectric heating of the plastic tubing under the pressure of the jaws intense the tubing to bring the opposite inner surfaces of the tubing together and enables them to melt.

As the pressure and melting action causes the jaws to approach each other more closely, the dielectric heating effect increases because the field strength increases and results in greater indentation of the tubing, etc. The result is an "avalanche" effect which forms an effective seal relatively rapidly.

The duration of the process will depend upon the thickness of the tubing, the amount of high frequency energy supplied and the force which clamps the jaws together.

Normal sealing takes about 1 to 2 seconds and upon the elapse of a period sufficient to cause fusion of the opposite walls of the tubing, the supply of the high frequency current is terminated and the tubing can be held in its pinched state for an additional period of about 1 second of cooling to set the seal.

With earlier devices for this purpose, it was not always possible to apply the specific force necessary for an optimum seal. In other words, while it has been found that an optimum force of between 130 and 170 Newton is required and a residual force of up to 20 Newton is desirable to maintain the seal after the energy supply has been terminated, earlier devices for pinching the tube while applying high frequency energy have not always proved to be satisfactory.

Furthermore, the electrodes of earlier systems were transverse to the handle of the device and insertion of the tubing between the electrodes often could not be viewed adequately by the operator because the manner in which the device was held, partly obstructed view of the gap between the jaws.

By and large, therefore, the earlier devices for the sealing of medical tubing utilizes the foregoing principals could not be considered to be ergonomic.

OBJECTS OF THE INVENTION

It is, therefore, the principal object of the present invention to provide an ergonomic tube sealer which is more efficient to use, enables the operator to see the sealing region more completely, and is free from the drawbacks of tube sealers of the types described above.

Another object of the invention is to provide an improved hand-operated tube sealer which enables the application of a specification force pattern to the tubing so that it can be pinched with a force between 130 and 170 Newtons during the application of the high frequency energy and a force of up to 20 Newtons can be sustained after the pinching action and the termination of the supply of the high frequency energy (preferably about 5 Newton residual force) so that drawbacks of the earlier systems are obviated.

It is also an object of the invention to provide a manually operable sealer which can be readily disassembled for cleaning or replacement of parts and which can be reassembled easily.

SUMMARY OF THE INVENTION

These objects and others which will become apparent hereinafter are attained, in accordance with the invention by providing a pair of electrodes so that they are mutually parallel and in line with a handle which is slightly curved or rectilinear and which carries the mechanism for actuating at least one of the electrodes so that it is displaceable transversely to itself and to the major dimension of that handle.

More specifically, the manually operable medical tubing sealer of the invention can comprise:

a handle;

a pair of electrodes in line with the handle, transversely spaced apart and longitudinally extending generally parallel to one another and to the handle, one of the electrodes being fixed on the handle, the other of the electrodes being movable transversely to the handle;

means on the handle for connecting the electrodes to a source of electric current capable of fusing a section of medical tubing inserted between the electrodes upon compression of the section between the electrodes;

an actuating lever on the handle extending generally therealong; and means operatively coupling the actuating lever to the other of the electrodes for displacing the other of the electrodes transversely to the handle to clamp the section of tubing between the electrodes.

When the electrodes are provided so that they are in line with the handle the insertion of the tubing is simplified since this insertion can be effected also in line with the length of the handle.

While this construction might appear to be simple at first blush, and without great implications, in practice it is a surprising advance in the art because, for instance, in the ergonomic sense the insertion of the tubing is facilitated while the view of the sealing action afforded by the device is vastly improved by comparison with the prior art devices and unexpectedly so.

The movement of the movable electrode perpendicular to the electrode extension and the major dimension of the handle represents a unique action with respect to tubing sealers and requires a vastly different construction from earlier systems.

While this construction is relatively simple, it has been found to be advantageous to transmit the displacement force to the electrode via at least one leaf spring which extends along the handle and is deflected by a lever pivotal on the handle into a generally S-shaped curve. The use of a leaf spring facilitates cleaning since a leaf spring can be cleaned more easily than a coil spring of the type used in earlier sealers.

The leaf spring also allows the application of a prestress to the electrodes, thereby permitting the desired pinching force to be applied during the high frequency heating and insuring that a residual force will also be applicable subsequent to fusion.

When the movements of the lever and the electrode are defined, the force which is applied to the tubing will only depend upon the spring constant of the leaf spring, a magnitude which can be readily controlled.

The formation of the S curve insures that the force applied to the electrode will not exceed say 150 Newtons at an end point in the displacement of the lever. While melting of the tubing during the pinching action will cause the electrodes to come closer together and the leaf spring bent into its S configuration to relax slightly, the residual force of say 5 to 20 Newtons can be maintained until the lever is released and the electrode spread apart to allow the sealed tubing to be removed.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
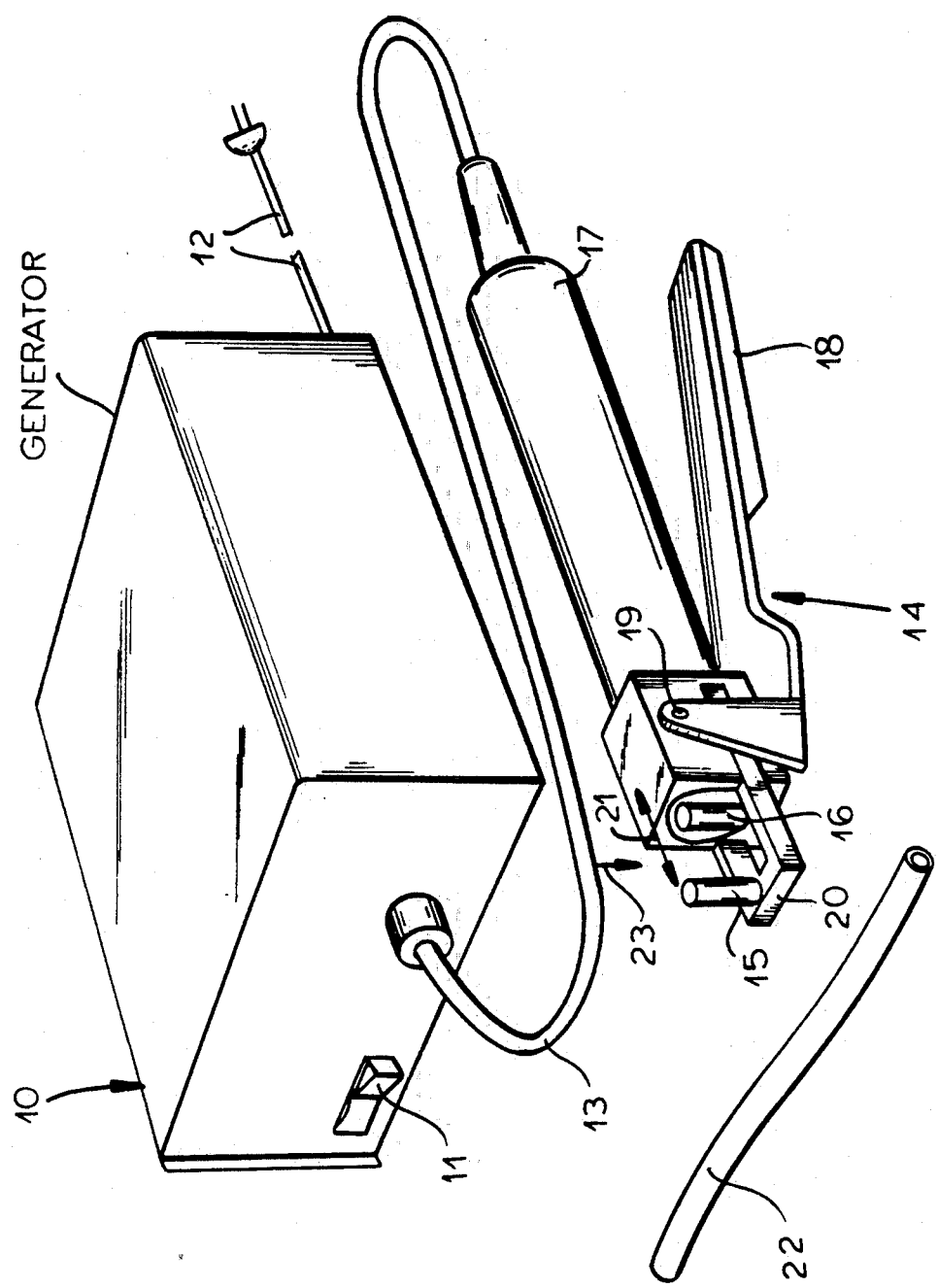
FIG. 1 is a perspective view showing the key elements of a tube sealer of the prior art.

As can be seen from FIG. 1, which represents a prior art system, a high frequency generator 10 can have an on/off switch 11 and can be connected to the electrical mains via a lead 12 shown only diagrammatically. A coaxial cable 13 can connect the high frequency generator with the manually operated sealing tool 14 which can have a pair of electrodes 15, 16 extending perpendicular to the axis of an elongated handle 17. The electrode 15 can be displaced parallel to the major dimension of the handle 17 by a lever 18 which is pivoted at 19 on the handle 17. For this purpose, the handle 18 may engage a carriage 20 which is slidable in the direction of arrow 21

In operation, the medical tubing 22 to be sealed is inserted between the electrodes 15 and 16 in the direction of arrow 23, i.e. perpendicular to the longitudinal direction of the handle 17 and parallel to the electrodes 15 and 16 which form jaws between which the tubing is pinched. Once the tubing is pinched between these jaws, the high frequency energy is supplied and, in accordance with the principals of the aforementioned patent, the tubing is dielectrically heated and the opposite walls are fused together to form the seal.

Figure 2:
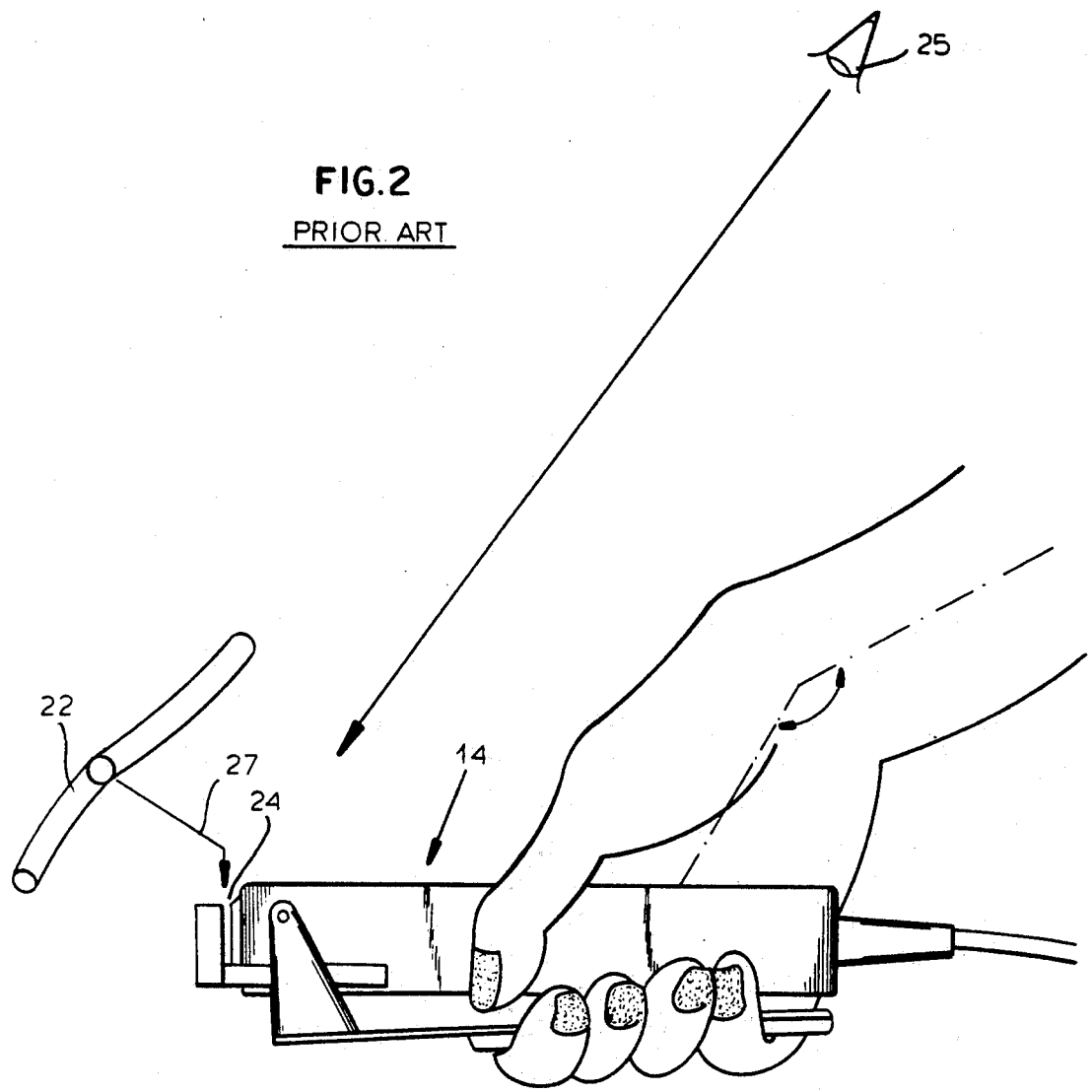
FIG. 2 side elevational view of a tube sealer in a use position illustrating the ergonomic problems therewith.

As will be apparent from FIG. 2 which also represents the prior art device in use, in order to allow the insertion side 24 of the tool 14 to be visible to the eye 25 of the user, the hand 26 of the user must be cocked away from the body of the user at a particularly inconvenient angle. That angle makes it difficult to close the lever. The alternative, of course, is to obstruct the view of the region between the electrodes into which the tubing 22 must be inserted as represented by the arrow 27.

Figure 3:
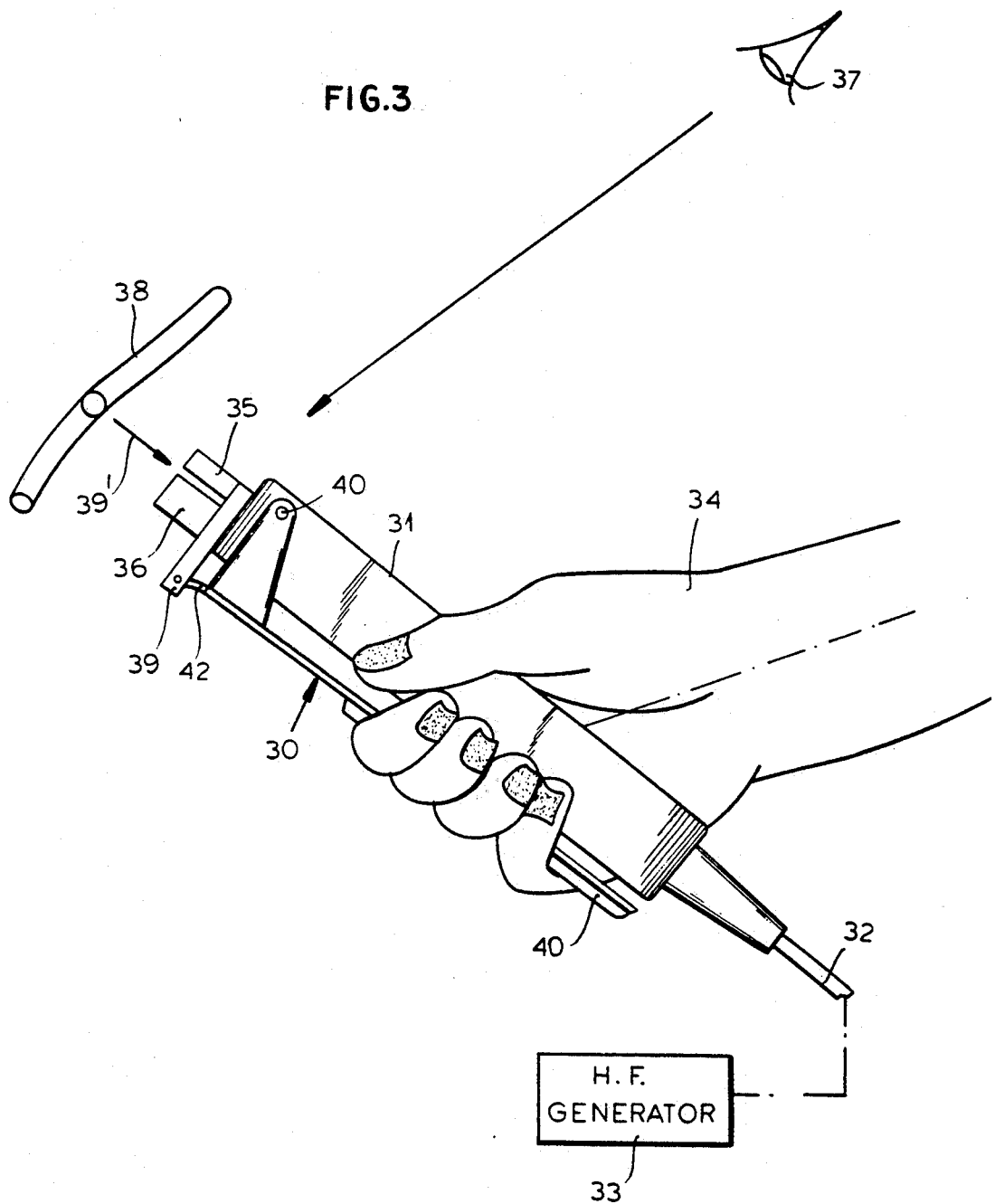
FIG. 3 is a view generally corresponding to FIG. 2 but illustrating the manually operated sealer of the present invention.
Figure 4:
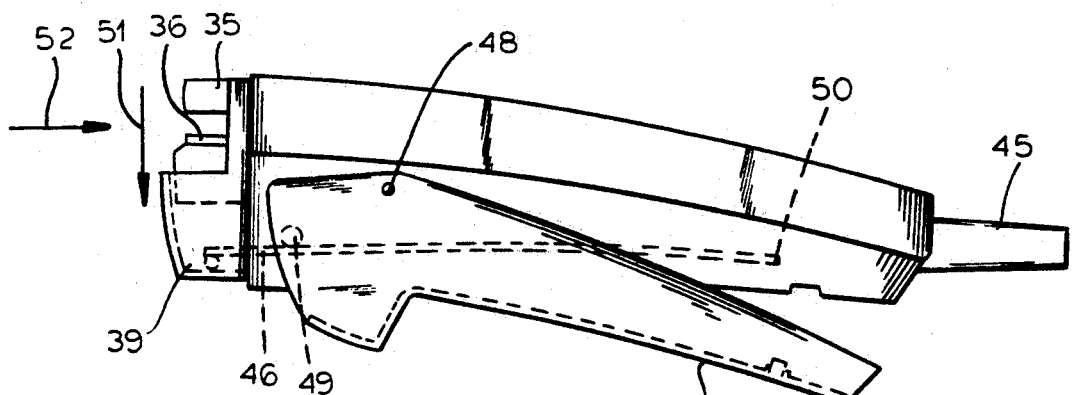
FIGS. 4 to 6 are side elevational views of another manually operated sealer tool according to the invention showing the lever in successive positions.
Figure 5:
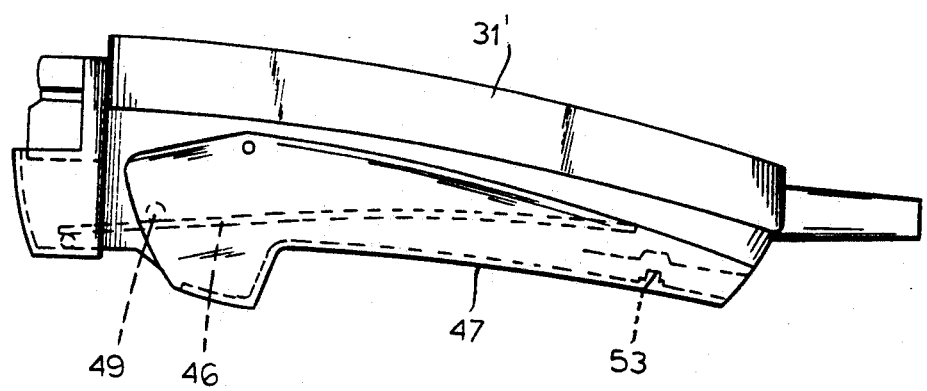
Figure 6:
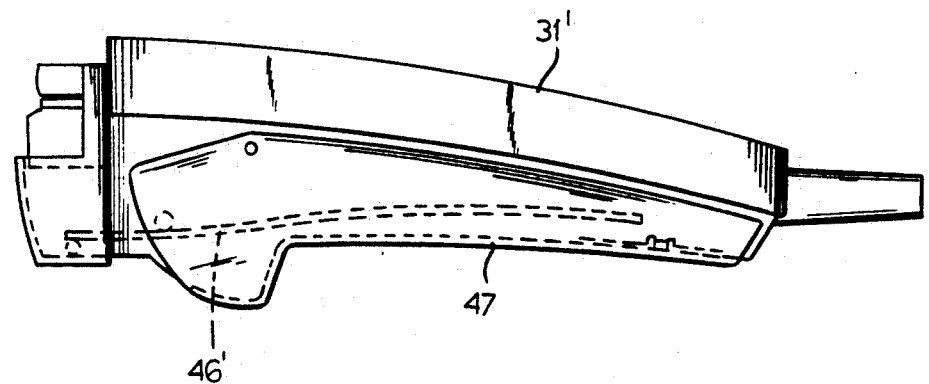

In the embodiments of the invention, the handle 31 of the device 30 connected by the coaxial cable 32 to the high frequency generator 33 may be rectilinear or as shown at 31' in FIGS. 4 to 6 may be slightly curved to conform more closely to the curvature of the palm of the hand 34 in which it is engaged. In the embodiment of FIG. 3, the electrodes 35 and 36 are in line with the length of the handle. With the handle in the more natural position shown in FIG. 3, the electrodes 35 and 36 are at a proper angle for viewing by the eyes 37 of the user and thus the tube sealer is more comfortable and more user frequently because the operator can insert the tubing 38 axially as represented by arrow 39' between the electrodes.

In this embodiment, electrode 36 is stationary or fixed on the handle 31 and the electrode 35 is movable on a carriage 39 by a lever 40 pivotally connected at 41 to the handle and bearing upon the carriage 39 via a leaf spring 42 only an end of which has been shown in FIG. 3.

Figure 8:
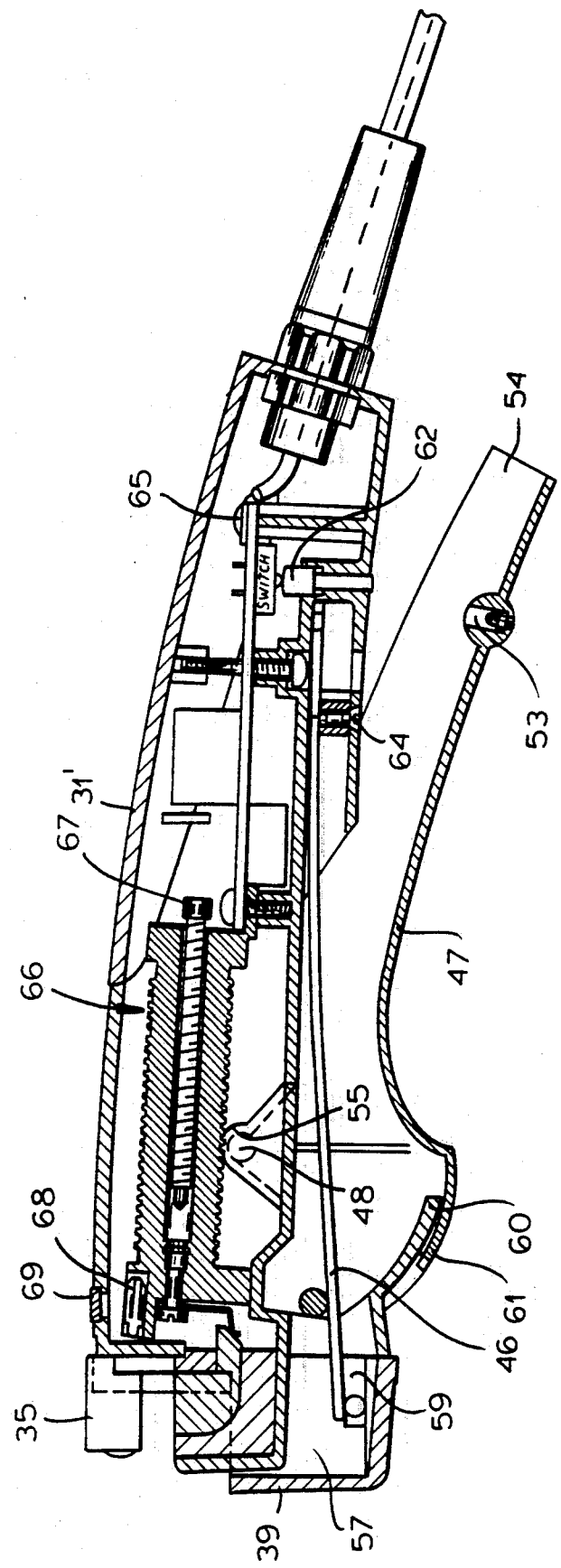
FIG. 8 is a longitudinal section through the device of FIGS. 4 to 6 showing the internal arrangements and of its parts.

In FIGS. 4 to 6, the handle 31' has a cable pull relief 45 at one end by which the coaxial cable is connected to the high frequency generator 33 and the electrode 35 has its carriage 39 engageable by a leaf spring 46 upon which the handle 47 operates. Then handle 47 has a pin 48 forming a fulcrum about which the handle 47 can pivot and a pin 49 which bears upon the leaf spring 46 which is anchored at 50 in the handle 31'. The free end of the leaf spring engages in a chamber of the carriage 39 as will be described in connection with FIG. 8 t the carriage 39 downwardly (arrow 51) when the pin 49 bears upon the leaf spring 46.

In its initial position shown in FIG. 4, the spring 46 is slightly deflected so that the spring action holds the parts together.

When the tubing is inserted between the electrodes 35 and 36 in the direction of arrow 52, i.e. the axial direction in line with the handle 31', the lever 47 can be squeezed toward the handle to rotate the lever in the counter clockwise direction (FIG. 5) and press the leaf spring 46 with the pin 49 downwardly to draw the electrode 35 against the tubing and pinch the latter. Further clockwise movement of the handle 47 to the remaining position shown in FIG. 6, causes a stud or pin 53 of the lever to operate a switch turning on the high frequency source to energize the electrodes and cause dielectric heat of the tube.

In the position shown in FIG. 6, at the moment that the high frequency energy is turned on, the spring has been deformed into an S curve applying a force of 130 to 170 Newtons to the tubing between the electrodes. During the sealing process, as the electrodes move closer together and fusion occurs, the force relaxes to a final force between 0 and 20 Newtons, preferably about 5 Newtons. The S curve in the leaf spring is represented at 46' in FIG. 6.

Figure 7:
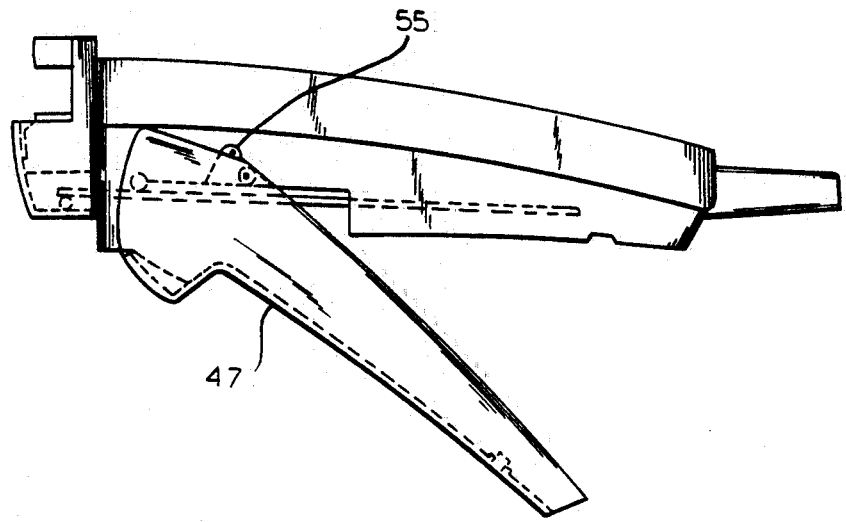
FIG. 7 is a side elevational view of the sealer of FIGS. 4 to 6 illustrating a partially disassembled position.
Figure 7A:
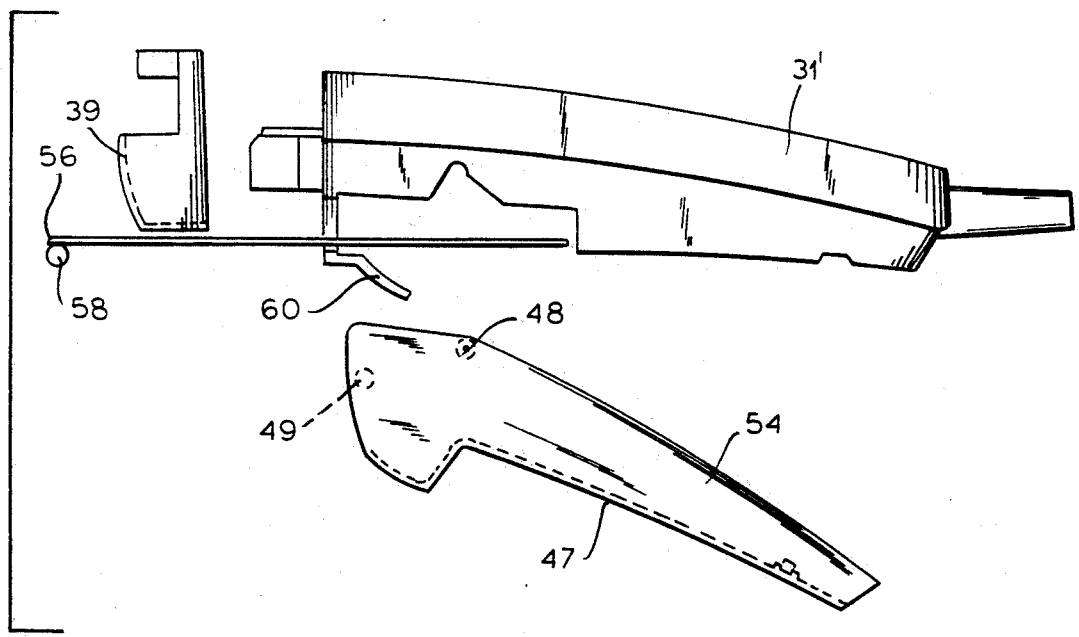
FIG. 7A is a view similar to FIG. 7 showing the parts more fully separated.

From FIGS. 7 and 7A, it will be apparent that the lever 47 is a shell between the walls 54 of which, the lower portion of the handle 31' is received. Pins 48 extending inwardly from the walls 54 engage in notches 55 in the opposite walls of the handle 31' so that the spring 46 will hold the pins in these notches as the lever 47 is rotated and after the lever 47 has been released. The free end of the spring 46 shown at 56 in FIG. 7A engages in a compartment 57 of the carriage 39 carrying the electrode 35 to displace this carriage. The pin 58 at the end of the spring 56 engages in grooves 59 on opposite walls of the compartment 57 so that the carriage 39 is captured on the leaf spring 46.

The front end of the handle 31' has a rearwardly extending apron 60 which is curved with a center at the pins 48 and corresponds to the center of curvature of an overlapping portion 61 of the lever 47. The pin 49 previously mentioned bears upon the leaf spring 46 as it passes within the lever 47. The stud 53 is adjustable for actuation of the switch 62 at the appropriate point in the closure of the lever 47.

According to the invention, moreover, the leaf spring 46 is anchored in the handle 31' by a screw 64.

The coaxial cable can have one terminal 65 connected through the switch 62 to a resonant network 66 which is tuned by a rod 67 and is in circuit with a neon lamp 68 visible through a window 69 on the handle 31'.

Figure 9:
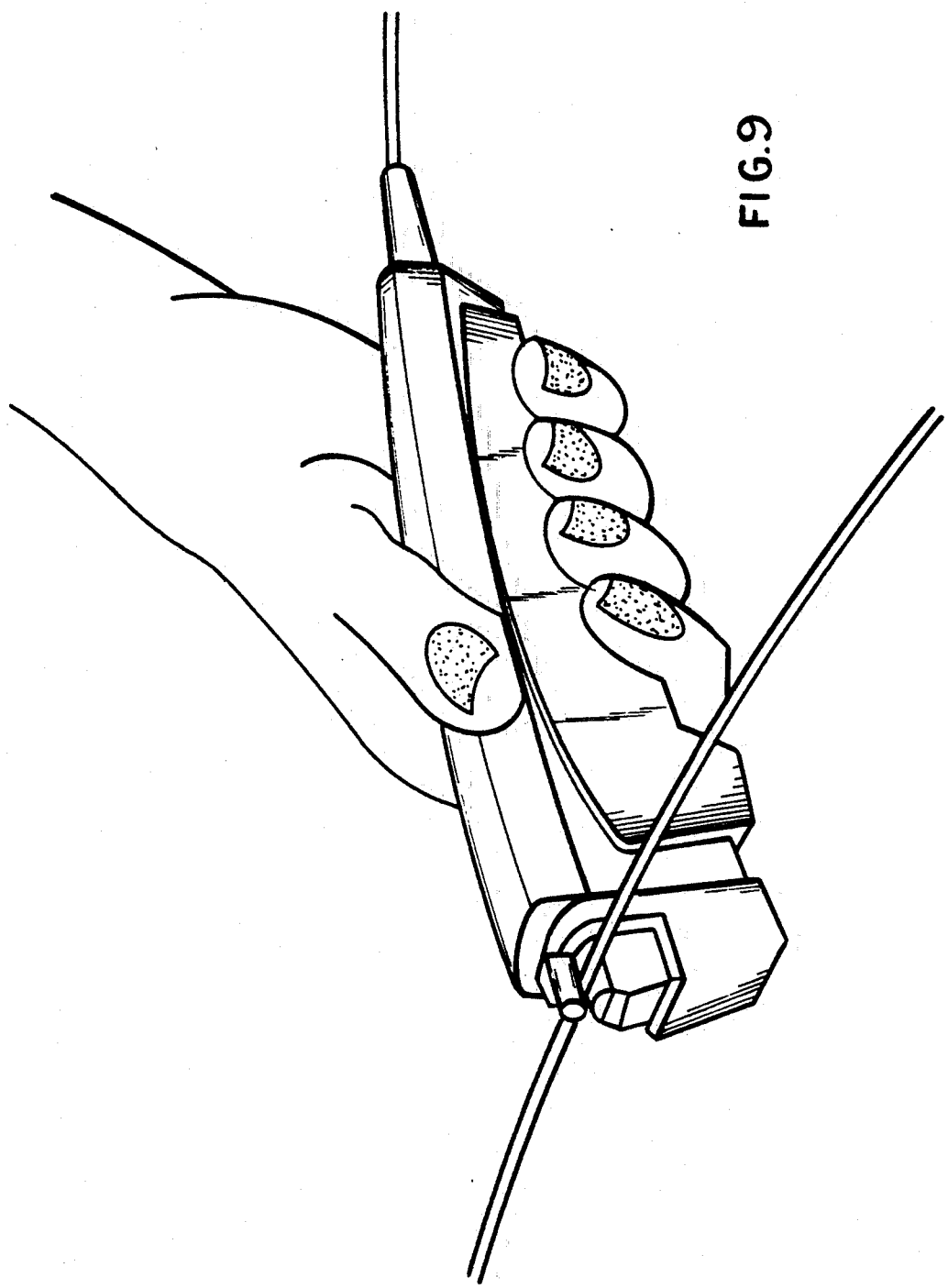
FIG. 9 is a view showing the sealer of the invention in the final stage of actuation.

As can be seen from FIG. 7A, the carrier 39 can be pulled from the leaf spring 46 and the leaf spring withdrawn from the handle 31' to free the lever 47 for ready disassembly of the device for cleaning. As FIGS. 8 and 9 will make apparent, the device can be held comfortably and after complete closure of the lever 47 to operate the switch 62 for a brief period of time which can be viewed through the window 69 since it results in the illumination of the neon lamp 68, the high frequency is automatically turned off and the device held for a second or so until cooling is achieved. At that point, the lever can be released.

We claim:
1. A hand-operated tube sealer for sealing plastic medical tubing, comprising:
   a handle;
   a pair of electrodes in line with said handle, transversely spaced apart and longitudinally extending generally parallel to one another and to said handle, one of said electrodes being fixed on said handle, the other of said electrodes being movable transversely to said handle;
   means on said handle for connecting said electrodes to a source of electric current capable of fusing a section of medical tubing inserted between said electrodes upon compression of said section between said electrodes;
   an actuating lever on said handle extending generally therealong;
   means for mounting said lever displaceably on said handle to pivot between a rest position of said lever corresponding to a spacing of said electrodes to receive said section between them and a clamping position wherein said section is compressed between said electrodes; and
   means operatively coupling said actuating lever to said other of said electrodes and including a leaf spring extending along said handle, engaged by said lever and having a respective end operatively connected with said other electrode for displacing said other of said electrodes transversely to said handle and toward said one electrode to clamp said section of tubing between said electrodes upon displacing said lever into said clamping position.

2. The sealer defined in claim 1 wherein said lever engages said leaf spring to apply an S-curve thereto resulting in application of a residual stress on said leaf spring upon conclusion of sealing and a corresponding residual stress upon said section.

3. The sealer defined in claim 2, further comprising means on said handle for switching on said current upon actuation of said lever to stress said tubing with a force of substantially 130 to 170 Newton.

4. The sealer defined in claim 3 wherein said residual stress is up to 20 Newton.

5. The sealer defined in claim 4 wherein said source is a high frequency electric current source and said electrodes function as capacitor plates to dielectrically heat said section of tubing between them.

6. The sealer defined in claim 5 wherein said handle is elongated and provided with said electrodes at one end, a connection to said source at an opposite end and said lever along a side of said handle.

7. The sealer defined in claim 6 wherein said other electrode is formed on a carrier mounted on said one end of said handle for movement perpendicular to said electrodes and said handle, said carrier having a compartment opening toward said lever and formed with a ledge, said leaf spring extending into said compartment and engaging said ledge.

8. The sealer defined in claim 7 wherein said lever is formed with a fulcrum pin receivable in a notch formed on said handle for removable mounting said lever on said handle, and an actuator pin bearing upon said leaf spring.

9. The sealer defined in claim 8 wherein said handle is provided with a formation remote from said actuator pin and engageable with said switch.

10. The sealer defined in claim 9 wherein said handle has a chamber open toward said one end and receiving said leaf spring, a screw being provided at said chamber to secure said leaf spring to said handle.

11. The sealer defined in claim 10 wherein said handle has a rearwardly extending curved apron centered on said fulcrum, pin, said handle having a curved wall lying along said apron.

12. The sealer defined in claim 11 wherein said lever has a configuration of a shell open toward said handle and partly receiving same.

13. The sealer defined in claim 12 wherein said one electrode is provided upon a forwardly extending formation of said handle partly received in said chamber.

* * * * *